(12) United States Patent
Tempany

(10) Patent No.: US 10,781,058 B2
(45) Date of Patent: Sep. 22, 2020

(54) PALLETISER FOR LOADING AND PACKAGING UNSTABLE CONTAINERS

(71) Applicant: Pacwel Ip Pty Ltd, Coburg North (AU)

(72) Inventor: Gary Tempany, Coburg North (AU)

( * ) Notice: Subject to any disclaimer, the term of this patent is extended or adjusted under 35 U.S.C. 154(b) by 0 days.

(21) Appl. No.: 15/713,670

(22) Filed: Sep. 24, 2017

(65) Prior Publication Data

US 2018/0009611 A1 Jan. 11, 2018

Related U.S. Application Data

(63) Continuation of application No. 14/898,383, filed as application No. PCT/AU2013/000628 on Jun. 12, 2013, now abandoned.

(51) Int. Cl.
| | |
|---|---|
| *B65G 57/00* | (2006.01) |
| *B65G 57/03* | (2006.01) |
| *B65B 11/58* | (2006.01) |
| *B65G 57/24* | (2006.01) |
| *B65G 57/10* | (2006.01) |
| *B65B 21/00* | (2006.01) |

(52) U.S. Cl.
CPC .......... *B65G 57/005* (2013.01); *B65B 11/585* (2013.01); *B65G 57/035* (2013.01); *B65G 57/10* (2013.01); *B65G 57/245* (2013.01); *B65B 21/00* (2013.01)

(58) Field of Classification Search
CPC .... B65G 57/22; B65G 57/242; B65G 57/245; B65G 57/24; B65G 57/02; B65G 57/035; B65G 5/06; B65G 61/00
USPC ...... 414/789.3, 789.5, 789.6, 924, 927, 928, 414/929, 799, 791.4, 791.5, 791.6, 792.6, 414/792.7, 795.2, 789.7, 789.9, 418.4, 414/463.4; 53/152–153, 537, 540; 198/435, 456, 468.6, 468.8, 809
See application file for complete search history.

(56) References Cited

U.S. PATENT DOCUMENTS

| | | | | |
|---|---|---|---|---|
| 5,035,571 A * | 7/1991 | Raasch | ................... | B65G 61/00 |
| | | | | 414/744.3 |
| 5,212,933 A * | 5/1993 | Cere' | ..................... | B65B 11/045 |
| | | | | 53/556 |
| 5,238,349 A * | 8/1993 | Grace, Sr. | ............ | B65G 1/0407 |
| | | | | 198/594 |
| 6,170,228 B1 * | 1/2001 | Zeman, III | ............ | B65B 11/025 |
| | | | | 53/168 |
| 6,357,985 B1 * | 3/2002 | Anzani | .................... | B65G 1/08 |
| | | | | 193/35 R |
| 6,589,008 B1 * | 7/2003 | Ingraham | ............. | B65G 47/907 |
| | | | | 198/468.3 |

(Continued)

FOREIGN PATENT DOCUMENTS

| | | |
|---|---|---|
| GB | 1282355 A | 7/1972 |
| GB | 1493917 A | 11/1977 |

*Primary Examiner* — Jeffrey A Shapiro
(74) *Attorney, Agent, or Firm* — Benjamin Aaron Adler

(57) ABSTRACT

The innovation disclosed herein is an improved palletiser for loading and packaging unstable articles, such as plastic, glass, steel, aluminium, etc. containers onto a pallet for bulk storage and/or transport. The innovation includes a pallet station having a pallet housing that receives pallets, a layer pad store substantially aligned with the pallet housing, a container lifting sub-assembly that receives a predetermined row of containers, a pusher assembly that urges the predetermined row of containers onto a pallet, and a layer pad transfer assembly.

10 Claims, 7 Drawing Sheets

(56) References Cited

U.S. PATENT DOCUMENTS

| | | | |
|---|---|---|---|
| 6,688,839 B1* | 2/2004 | Hirschek | B65B 21/06 |
| | | | 198/347.1 |
| 2004/0060263 A1 | 4/2004 | Blattner et al. | |
| 2004/0191050 A1* | 9/2004 | Lafontaine | B65G 37/02 |
| | | | 414/791.6 |
| 2007/0119687 A1* | 5/2007 | Kaiser | B65G 17/323 |
| | | | 198/570 |
| 2008/0050216 A1* | 2/2008 | Bolzani | B65G 57/005 |
| | | | 414/791.6 |
| 2008/0124208 A1 | 5/2008 | Ouellette et al. | |
| 2011/0076128 A1* | 3/2011 | Johnsen | B65G 21/14 |
| | | | 414/791.6 |
| 2011/0277423 A1* | 11/2011 | Magri | B65G 57/035 |
| | | | 53/443 |

* cited by examiner

PALLETISER FOR LOADING AND PACKAGING UNSTABLE CONTAINERS

CROSS-REFERENCE TO RELATED APPLICATIONS

This application is a continuation of pending application U.S. Ser. No. 14/898,383, filed Dec. 14, 2015, which is a national stage application under 35 U.S.C. § 371 of international application PCT/AU2013/000628, filed Jun. 12, 2013, now abandoned. The entirety of both of the above-noted applications is incorporated by reference herein.

BACKGROUND OF THE INVENTION

Field of the Invention

The present invention relates to an improved palletiser for loading and packaging unstable articles such as plastic, glass, steel or aluminum containers onto a pallet for bulk storage and/or transport. In particular the present invention relates to an improved palletiser system for efficient loading of multiple unstable articles such as bottles or cans and the like containers in bulk quantities onto a pallet for supply and transport.

Description of the Related Art

It is usual practice in a production line of manufactured articles, for the articles to be packaged into cartons or various containers for transport. Where there are multiple containers required to be transported by shipping or the like, the containers are usually loaded onto a pallet for convenient handling and to optimize load efficiency.

A pallet is a standard support and carrier structure for receiving stacked items thereon, whereby the pallet can be readily lifted and transferred by a lifting machine such as a 'fork lift". It is desirable from an economic perspective, to (a) maximize the number of articles onto a pallet, and (b) load the pallet as efficiently and timely as practicable.

Palletisers are known to load containers or cartons of articles onto a pallet in an organised stacked condition to make optimal use of available space. One method of palletising includes building of layers where cartons of articles are formed in rows, and rows formed into layers. In this method, rows of articles are constructed, and the rows are transferred to a layer assembly platform until a layer is completed. The completed layer is then transferred to the load under construction. The layer assembly platform is withdrawn from the layer of items to deposit the layer onto the pallet or a previously deposited layer.

Often, in order to optimise load capacity, articles for forming the layer are initially oriented in a desired pattern at a loading location. Once in the desired pattern, the layer is typically squared before transfer to a pallet. This necessarily means that such a process is discontinuous, and stability of the progressively formed layers of cartons of articles relies on the inherent stackability of one carton on top of another.

A further drawback with such a palletiser method/system is that while this might be suitable for solid containers such as cartons or boxes containing multiple items therein, the system is not practical for loading of multiple unstable items such as plastic, glass, steel or aluminium containers including cans, jars and bottles. For example, loading of single manufactured bottles leads to breakages and/or fallen product which disrupts the loading and layer process. Hence manufactured bottles, for example, are usually packaged initially into cartons or boxes, and the boxes subsequently loaded onto a pallet by the layer method/system. This step of pre-packaging of bottles into cartons or boxes is time consuming and adds a layer of costs to a loading process.

Some attempts have been made to address the shortcomings of palletisers for loading bottles. One attempt disclosed in BP 1,932,783 provides a machine which manipulates a group of articles such as bottles by arranging similarly sized objects in a predefined pattern. Once a layer has been arranged, a gripping member picks up the layer and transfers to a pallet. An example of a gripping member can be seen in WO02/04327 having a plurality of spaced apart rods forming channels therebetween, whereby the channels are adapted to receive bottles which are suspended by the neck.

Palletisers of the above type require a substantial space within which to operate not the least because a pattern of articles needs to be pre-formed, and a large gripping structure is required to locate and receive the layer pattern formed, and then transfer the load to a pallet. The array of steps required for loading on to a pallet is also somewhat disjointed to the extent that the rate of layer formation is relatively slow. There thus remains a need for a palletiser apparatus which can substantially continuously load unstable articles such as bottles onto a pallet for transport.

An alternative form of loading comes in the form of a robotic pick and place palletiser. Such a palletiser uses a programmable mechanism to pick an item from a picking location and transfer to a pallet load. This type of system is practical for non-rigid bagged items where the contents can move and flow because the bags can be dropped and pliable contents deform to previously deposited bags. Hence final placement accuracy is less critical and higher rates therefore attainable. This type of palletiser however cannot be used for loading and packaging unstable manufactured bottles.

Robotic palletisers are also known that will pick a predetermined row of containers and transfer these to the pallet. However these type of palletiser have practical drawbacks including when changing to a different stack pattern such as extra bottles in a row, end of arm tools such as a row of container pick up arms need to be changed. Such systems also require a large space to operate in to the extent that an area must encompass the swing arc of the robot, as well as an array of spaced apart stations that in turn need to be maintained and stocked.

It is therefore an object of the present invention to address one or more of the foregoing problems. It is a further object to provide the public with a useful alternative.

SUMMARY OF THE INVENTION

The present invention is directed to a palletiser system for efficient loading and packaging of unstable containers, the palletiser including:

a pallet housing for receiving in-feed of a pallet(s) from a pallet in-feed path, the pallet housing having a floor portion for supporting a pallet thereon, the floor portion being movable between a pallet receiving position and a container receiving station in a first pathway by a fast lifting means in the first pallet station, wherein in a loading condition the pallet is raised to the container receiving station;

a layer pad store aligned substantially with and in spaced apart relation to the pallet housing, the layer pad store being adapted to receive a store of layer pads for placement over a layer of containers on a pallet;

a passageway intermediate the pallet housing and layer pad store for communication with a container in-feed;

a container lifting sub-assembly mounted within the passageway, wherein the container lifting sub-assembly includes a movable platform for receiving a predetermined row of containers from the container in-feed, the movable platform adapted to move by a second lifting means between a container in-feed condition and a container transfer station located adjacent the container receiving station, whereby the movable platform is raised by the lifting means to the container transfer station when a predetermined row of containers is detected on the movable platform, and wherein the movable platform defines a second pathway within the first pallet station substantially parallel to the first pathway;

a pusher assembly including a pusher arm member mounted within the first pallet station adjacent the container transfer station, the pusher arm being reciprocally operable in a third pathway above and in a transverse plane to the first and second pathway to urge a predetermined row of containers on the container receiving platform at the container transfer station onto a surface portion of the pallet immediately adjacent thereto, whereby the movable platform is transferred to the container in-feed condition following transfer of the predetermined row of containers for receiving a second row of containers in a repeated cycle;

a layer pad transfer assembly located adjacent the layer pad store, the layer pad sub-assembly including a layer pad transfer means whereby when a predetermined layer of containers is formed on the pallet, the layer pad transfer means is actuated by the layer pad assembly to engage a layer pad from the layer pad store and transfer the layer pad over and onto the layer of containers in a fourth pathway within the first pallet station substantially parallel to the third pathway, whereby the layer pad provides a fresh surface thereon for a second and subsequent layers of containers;

wherein when a layer pad is placed over a layer of containers on the pallet, the floor portion of the pallet housing is incrementally lowered within the pallet housing to receive a second and progressive layers of containers, whereby when a predetermined number of layers is stacked on the pallet, the pallet is automatically lowered within the pallet housing to the pallet receiving position to allow transfer of the pallet to an exit pathway, and receipt of a replacement pallet in a cyclical manner.

The present invention overcomes a number of disadvantages of prior art systems. In particular, the instant palletiser system is able to deal with multiple containers in a stable manner so as to substantially avoid the need for pre-packaging of otherwise unstable articles. This represents a clear departure from the prior art to the extent that the instant palletiser is less labour intensive while increasing packing efficiency and productivity. Further, the interaction between the defined pathways within the pallet station allows the palletiser to occupy a relatively small footprint.

Throughout the description the term 'containers' includes plastic, glass, steel, aluminium jars, cans, bottles and the like containers.

In one embodiment, the containers can be plastic bottles or glass jars or steel or aluminium cans.

The palletiser system can further include a container in-feed conveyor for transferring multiple bottles to the first pallet station through the passageway, the in-feed conveyor having a conveying portion configured to enter the passageway in a direction substantially transverse to the pallet in-feed path.

The palletiser system according to the present invention can include one or more palletiser stations in a series having aligned passageways for receipt of an in-feed conveyor, wherein in a preferred form the in-feed conveyor includes a plurality of vertically spaced and parallel bottle in-feed lines linking each pallet station such that in a single pass each container receiving station can receive a plurality of bottles. In this embodiment the series of palletiser stations are linked by a plurality of vertically spaced apart bottle in-feed conveyors arranged in parallel, and the aligned passageways of each pallet station provides a through pathway for the bottle in-feed conveyor to pass therethrough, wherein a first in-feed conveyor feeds bottles to the first palletiser station and subsequent in-feed conveyors feed containers to the at least second and third palletiser stations linked in the series.

One advantage of the series of palletiser stations so linked is that the loading of one row of containers on a first pallet can be offset with the series of palletiser stations so that loading and palletising process by the system can be substantially continuous.

When a predetermined number of bottles forming a row of containers is received on a container receiving platform at the container receiving station, the platform is raised by the second lifting means to a predetermined level within the first pallet station located adjacent the pallet when the pallet is at the bottle receiving station.

The first pallet station can include a pallet in-feed sub-assembly for transferring a feed of pallets from a pallet store. The pallet in-feed sub-assembly can include a transfer means such as a track or roller system electrically operable to transfer a pallet along the path for loading onto the floor portion of the pallet housing. The floor portion of the pallet housing can include a track or roller system adapted to cooperate with the in-feed path to allow automatic loading of a pallet onto the floor portion.

The pallet in-feed sub-assembly can include:

(i) a delivery in-feed conveyor for receiving and transferring at least one pallet of stacked used layer pads; and (ii) a pallet control means downstream from the delivery in-feed conveyor, the pallet control means adapted to position the pallet on the in-feed conveyor for transferring onto the floor of the pallet housing.

The layer pad transfer assembly can include a sub-assembly mounted within the pallet station above the layer pad store for supporting sliding movement of the layer pad transfer means between a pick-up and transfer conditions, wherein the transfer means is adapted to pick up and locate a top layer pad from the layer pad store on to the layer of containers on the pallet.

The layer pad transfer means can include:

(i) a vacuum head assembly comprising a vacuum generator, suction cups and a frame;

(ii) a head frame guided cylinder for adjusting the height of the head assembly; and (iii) a gantry linear drive for providing substantially horizontal movement to the head assembly between the layer pad store and the pallet in a bottle receiving position.

The palletiser system can further include a pallet out-feed path for transferring a fully loaded pallet exiting the pallet housing of the pallet station to a further processing station downstream therefrom. The out-feed path can include a transfer means, which cooperates with the track or roller of the floor portion.

The palletiser system can include a plastic wrapping station intersecting the pallet out-feed path, whereby the wrapping station can include a rotatable platform and a plastic wrapping structure, on which there is located wound plastic wrap material, wherein an initial portion of the wrap material is contacted with the loaded pallet and thereafter the platform is rotated so that the plastic wrap material is unwound from the wrapping structure about the loaded pallet.

The palletiser system can further include a container manufacturing apparatus such as a plastic bottle manufacturer upstream from the first pallet station, wherein bottles manufactured are dispensed by the container manufacturing apparatus onto the one or more bottle in-feed conveyor(s) for transfer of the containers to one or more pallet stations for loading onto a pallet.

In a related aspect of the present invention there is disclosed a palletiser system for efficient loading and packaging of unstable items such as plastic or glass bottles or steel or aluminium cans, the palletiser system including:

a series of palletiser stations for receiving bottles and pallets for substantially continuous loading, the stations including:

a pallet housing for receiving one or more pallets from a pallet in-feed, the pallet housing includes a movable floor portion, the floor adapted to be raised and lowered by a lifting means within the palletiser station between a pallet receiving condition and a bottle receiving location at a predetermined level, whereby the movable floor defines a first pathway within the pallet station, a layer pad store for receiving a stack of layer pads for placement over a layer of bottles on a pallet, the layer pad store being spaced apart from and in substantial alignment with the pallet housing;

an entrance and exit opening in each of the pallet stations defining a passageway therebetween intermediate the pallet housing and layer pad store, wherein the series of pallet stations is aligned so that the passageways form a thoroughfare;

an in-feed conveyor assembly for transferring bottles to each pallet station in a single pass including a plurality of vertically spaced and parallel bottle in-feed lines linking each line to a pallet station via the thoroughfare, wherein at least a portion of the in-feed lines extend in a pathway substantially transverse to the pallet in-feed;

a bottle lifting sub-assembly mounted within the each passageway, wherein the bottle lifting sub-assembly includes a movable platform for receiving a predetermined row of bottles from at least one of the bottle in-feed lines, the movable platform adapted to move by a second lifting means between a bottle in-feed condition and a bottle transfer station located adjacent the bottle receiving station, whereby the movable platform is raised by the lifting means to the bottle transfer station when a predetermined row of bottles is detected on the movable platform, and wherein the movable platform defines a further pathway within the first pallet station substantially parallel to the first pathway;

a bottle pusher means movably mounted to the each palletiser station adjacent the layer pad store, and operable between a stationary mode and a pushing mode, whereby in a stationary mode sufficient space is provided between the floor portion of the pallet housing and the pusher means for receiving the bottle receiving platform therebetween in a bottle dispensing position whereby the pallet and platform form a substantially continuous surface, and whereby in a pushing mode the pusher means moves over a fourth defined pathway which intersects with the second pathway for urging a row of bottles on the bottle platform onto a surface of the pallet;

a layer pad applicator sub assembly above the layer pad store including a layer pad transfer means, wherein when a predetermined layer of bottles is placed on a surface of the pallet, the layer pad transfer means is actuated to take a layer pad from the layer pad store and transfer the layer pad over and onto the layer of bottles in a fifth defined pathway overlapping the first defined pathway;

whereby when a predetermined layer of bottles is loaded onto a surface of the pallet and a layer pad is disposed on the predetermined layer, the floor portion of the pallet housing is lowered incrementally within the housing so that a fresh surface of layer pad is presented for receiving the next layer of bottles from the bottle loading platform.

A particular advantage of the improved palletiser system is that the first to fifth pathways within the first palletiser station provide a substantially reduced footprint, that is, the palletiser station occupies less available space than prior art palletisers. This is clearly advantageous where space is at an increasing premium.

DESCRIPTION OF THE DRAWINGS

An embodiment of the present invention will now be described by way of example only with reference to the accompanying drawings in which.

DESCRIPTION OF THE PREFERRED
EMBODIMENT WITH REFERENCE TO THE
DRAWINGS

Figure 1:
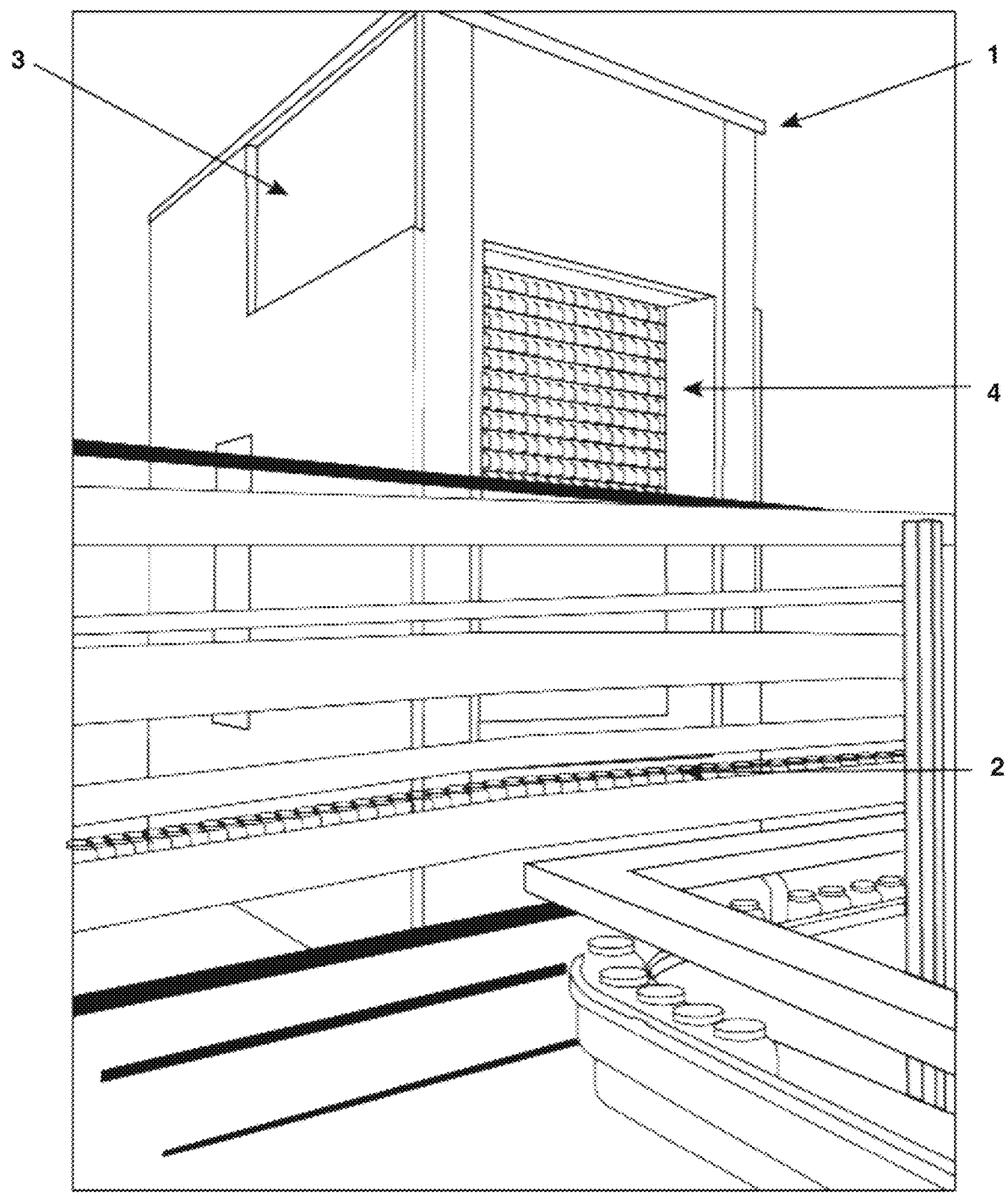
FIG. 1 is a photograph of a palletiser system including a palletiser station for loading and packaging bottles in accordance with an embodiment of the instant invention from a pallet loading elevation.
Figure 2:
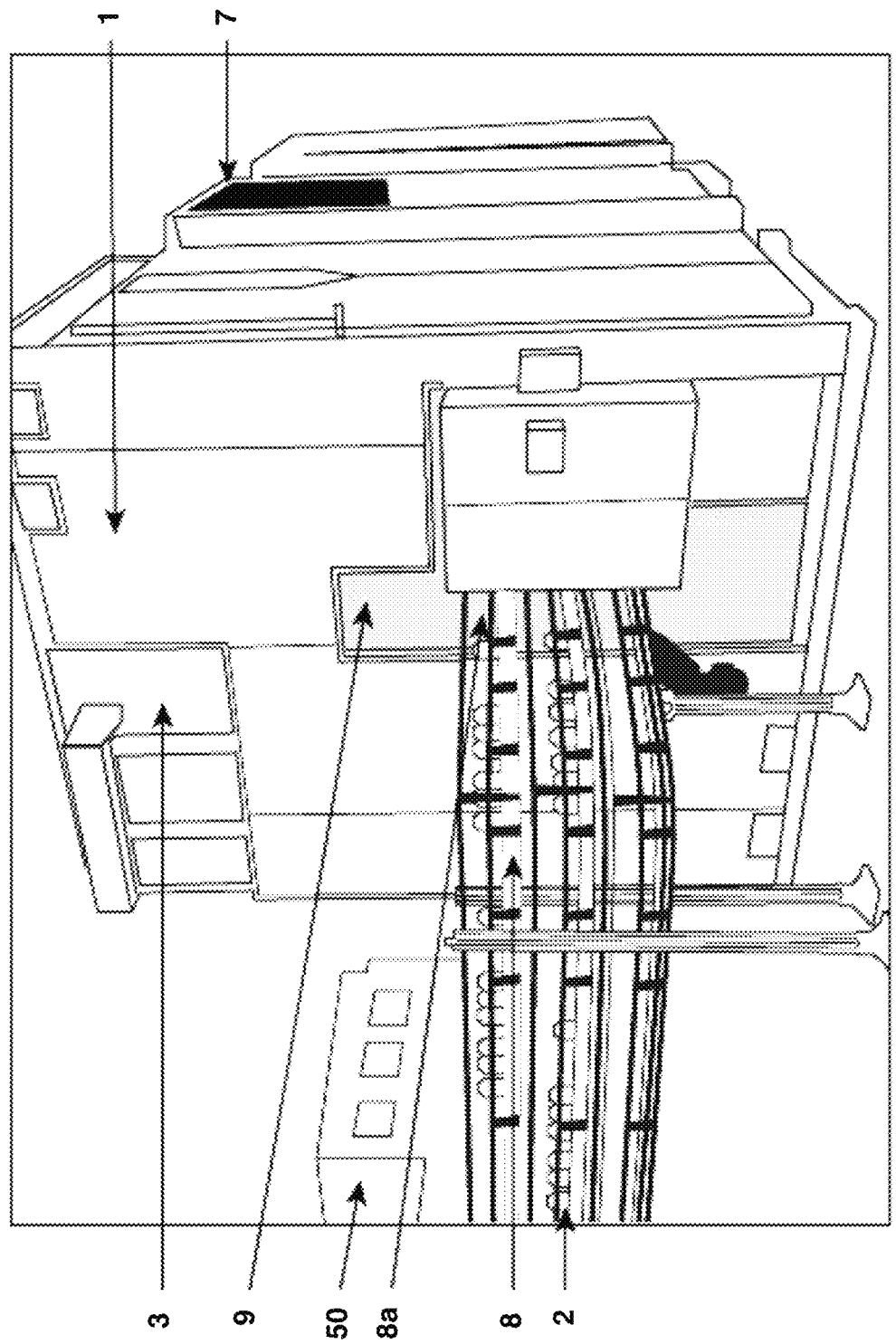
FIG. 2 is a photograph of a palletiser system including a palletiser station of FIG. 1 shown from a transverse side.
Figure 3:
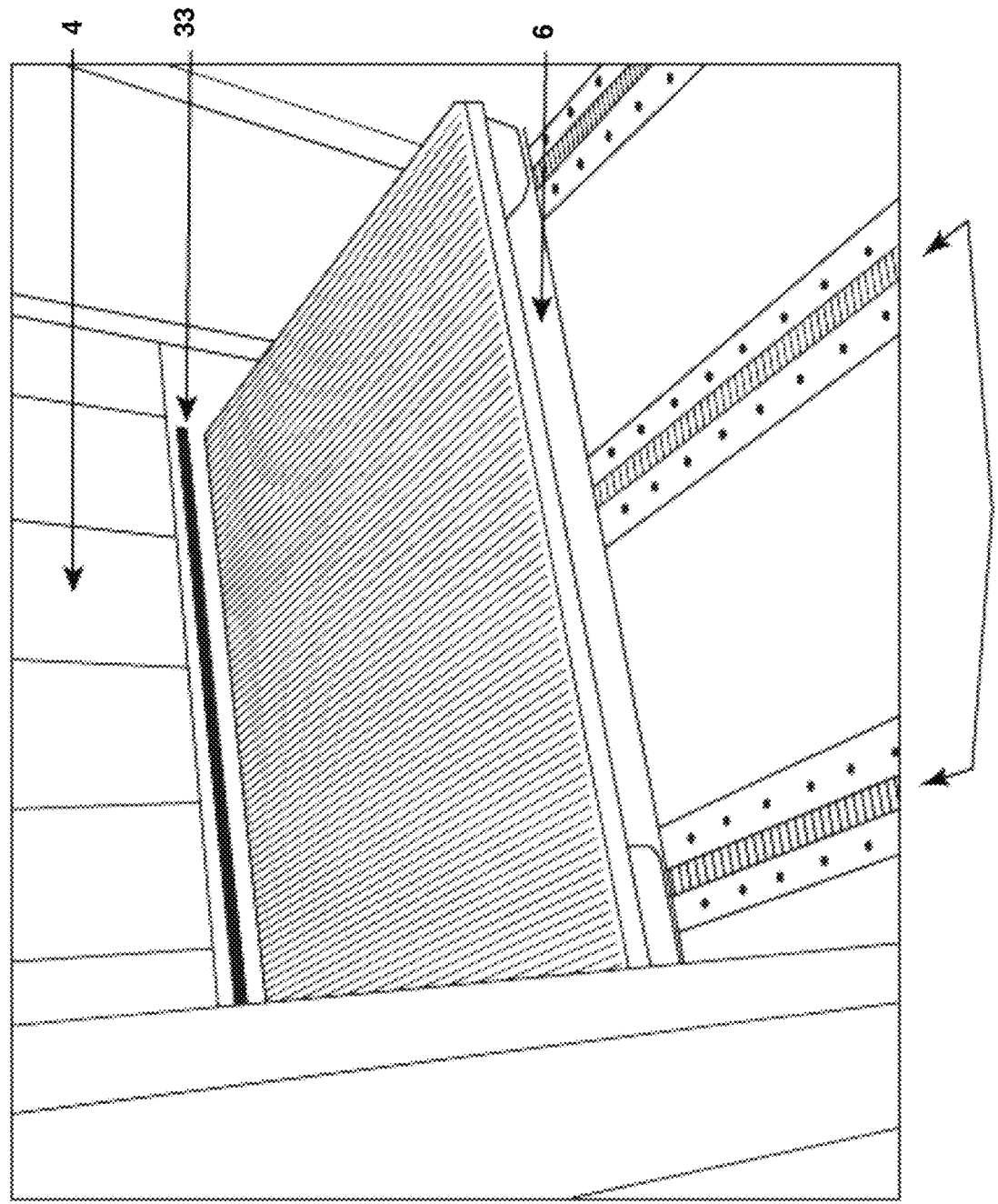
FIG. 3 is a close-up photographic view of a palletiser housing of a palletiser station in accordance with an embodiment of the instant invention.

Referring to FIGS. 1 and 2, there is shown a palletiser system 1 for efficient loading and packaging of unstable container items such as plastic bottles 2. The palletiser system includes a pallet station 3 having a pallet housing 4 (best seen in FIGS. 3, 4 and 6), which receives a pallet 5 therein from an in-feed station (not shown) onto a movable floor portion 6. In operation, the floor 6 is raised and lowered within the housing 4 by an electrically operated hoist 30 within the pallet station.

Figure 4:
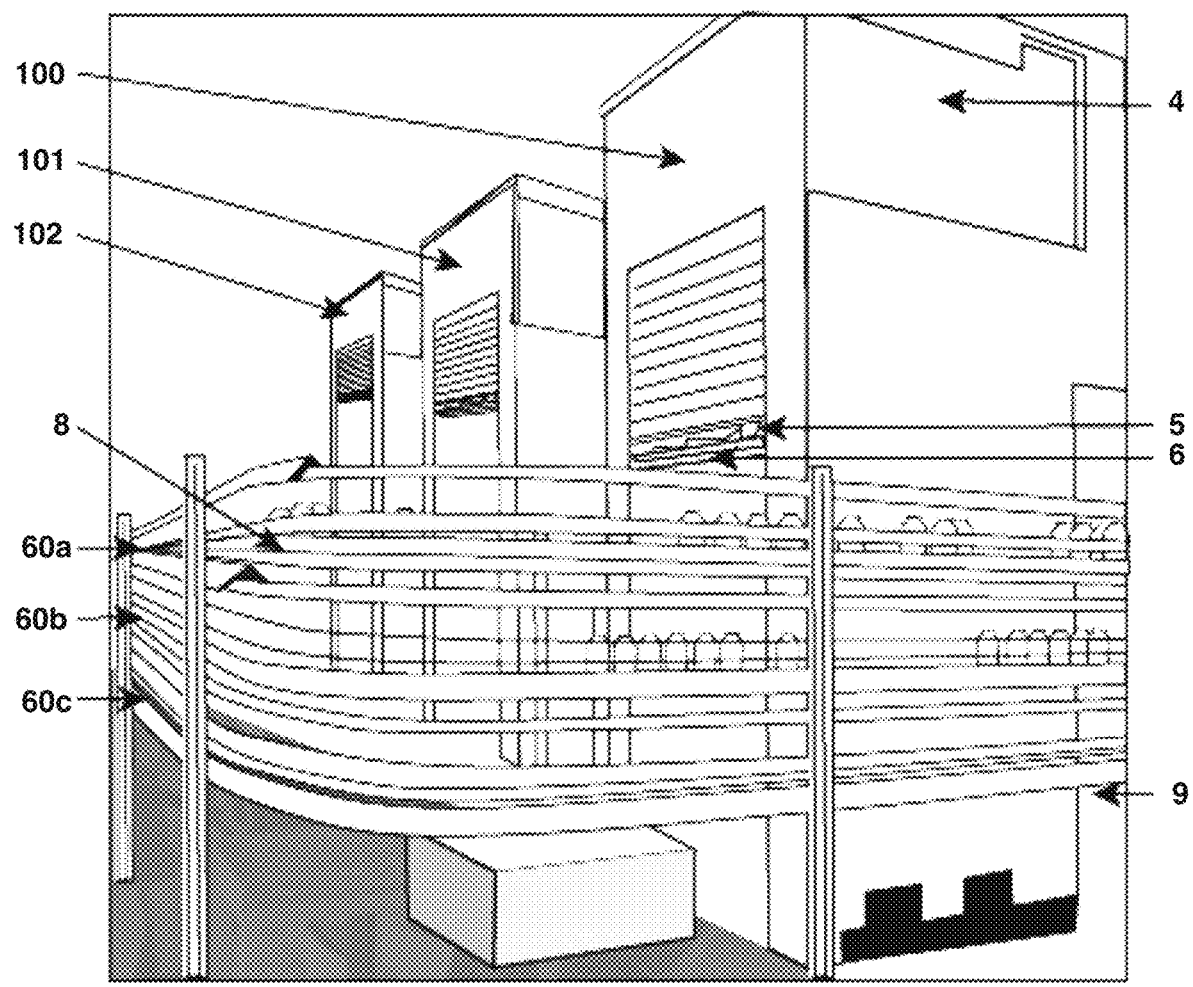
FIG. 4 is a photograph of a palletiser system including a series of palletiser stations in accordance with an embodiment of the present invention shown from a side perspective elevation.
Figure 5:
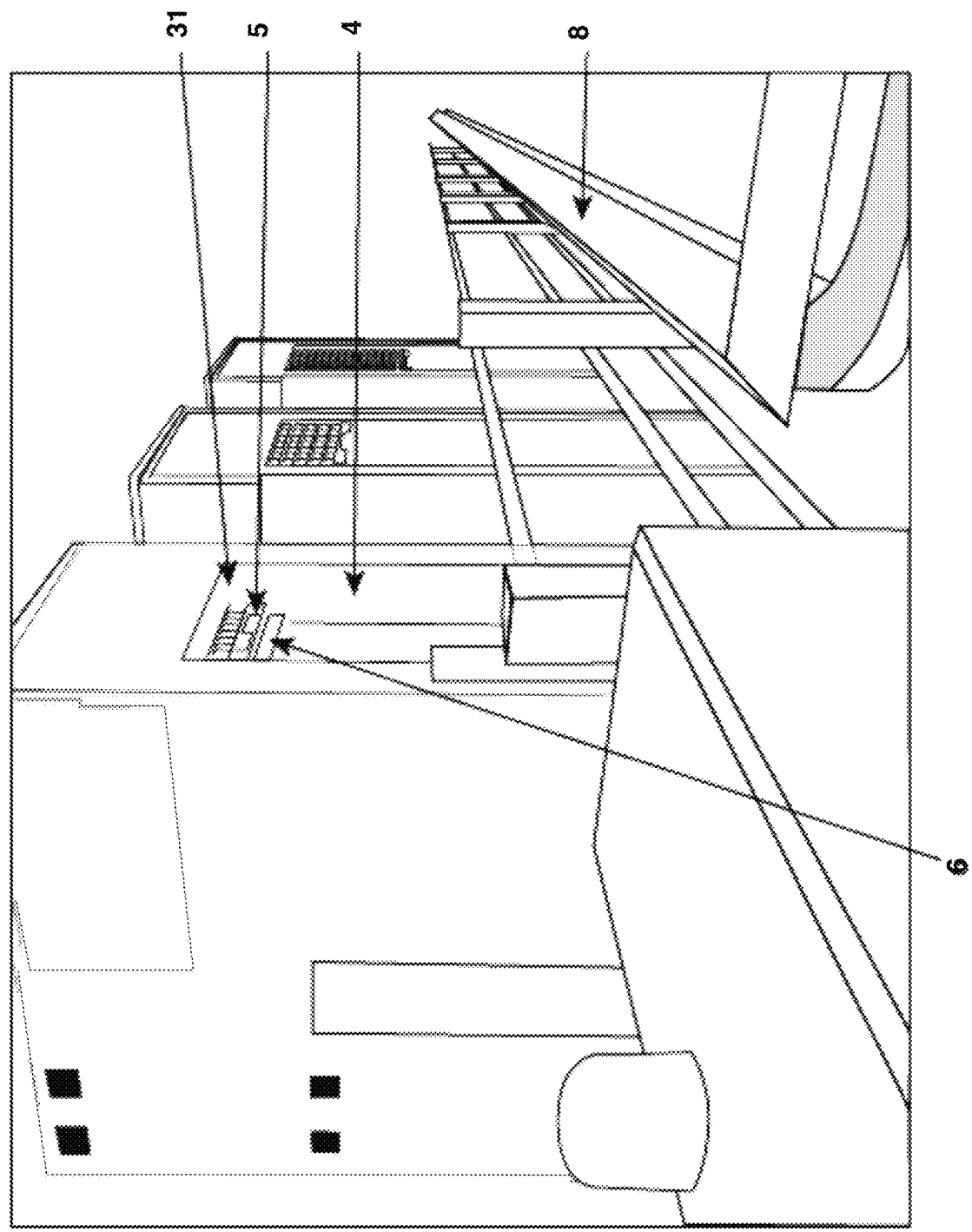
FIG. 5 is a photograph of a palletiser system including a series of palletiser stations in accordance with FIG. 4 shown from an opposite side perspective elevation.

The floor portion is lifted between a pallet receiving condition (refer FIG. 3), in which a pallet is transferred from a pallet in-feed station, and an elevated bottle receiving/loading position 31 (see FIGS. 4 and 5).

As shown in FIGS. 1 and 2, the pallet station 3 further includes a layer pad store 7 having a stack of layer pads, and an open side portion 9 of the pallet station 3 transverse to the pallet housing, for receiving bottles from an in-feed conveyor 8. The open side portion 9 of the palletiser station defines the opening of a passageway (not shown) which extends into the pallet station between the pallet housing 4 and layer pad store 7. Within the passageway there is mounted a bottle receiving station (not shown) and a lifting assembly.

The bottle receiving station includes a movable bottle receiving platform (not shown), which is movable by a lifting assembly (not shown) between a bottle receiving position, in which the platform receives a predetermined row of bottles from the in-feed conveyor 8, and a bottle loading position (not shown) immediately adjacent the pallet when the pallet is in the bottle receiving position 31.

At least a portion of the in-feed conveyor 8 includes an in-feed pathway 8a which enters the opening 9 and extends at least partially into the passageway of the pallet station 3 for transfer of bottles onto the movable platform. A predetermined number of bottles for forming a row on the pallet is transferred onto the bottle receiving platform. Once the predetermined number of bottles is transferred onto the bottle receiving platform, the platform is elevated by the lifting assembly (not shown) to the bottle loading/dispensing position in the pallet station immediately adjacent the pallet when the pallet is in a bottle receiving position. The pallet station also includes a push member (not shown), which is actuated when a predetermined row of bottles is presented at the bottle dispensing position. The push member operates by reciprocal movement between a stored static condition and a pushing condition. In the static condition, the push member is located sufficiently away from the bottle receiving location so that the movable platform can be received between the pallet and push member.

The palletiser system of the present invention further includes a pallet in-feed sub-assembly 33 (see FIG. 3) for transferring a feed of pallets from a pallet store (not shown). The pallet m-feed sub-assembly includes a track system 34 electrically operable to transfer a pallet along a path for loading onto the floor portion 6 of the pallet housing. The floor includes a mating track system adapted to cooperate with the in-feed path track to allow automatic loading of a pallet onto the floor.

The pallet in-feed sub-assembly includes a delivery in-feed conveyor (not shown) for receiving and transferring a pallet; and a pallet control operating system downstream from the delivery in-feed conveyor. The pallet control system is adapted to position the pallet on the in-feed conveyor for transferring onto the floor of the pallet housing.

Figure 7:
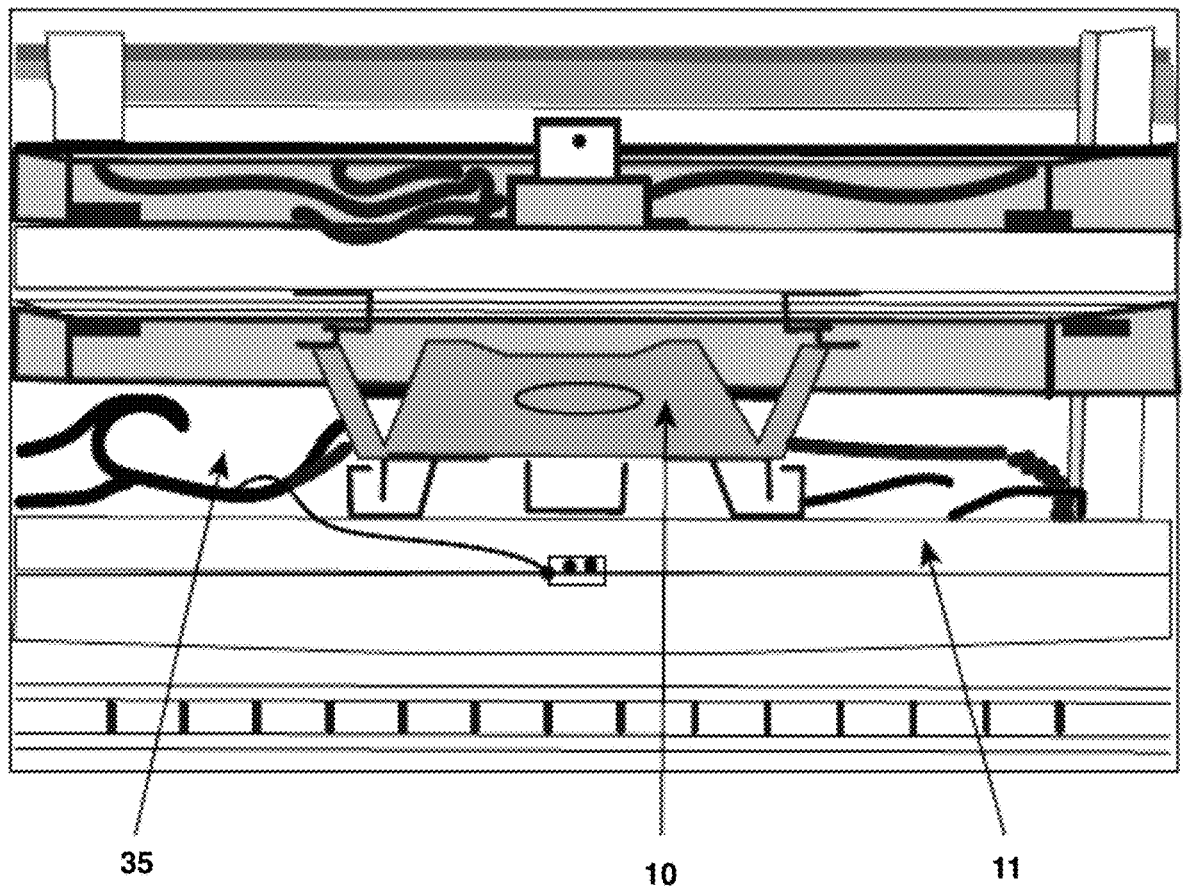
FIG. 7 is a photograph of a layer pad transfer assembly of a palletiser station in accordance with an embodiment of the instant invention shown in a perspective view.

Referring to FIG. 7, the pallet station further includes a layer pad transfer assembly 10 which is mounted to an upper portion of the pallet station adjacent the layer pad store. The layer pad transfer assembly includes a layer pad transfer member 11, which is controllably movable on a frame of the assembly by actuators (no shown) between a pick up condition and a drop off condition. The layer pad transfer assembly further includes a sub-assembly mounted within the pallet station above the layer pad store which supports the layer pad transfer member for sliding movement therealong between a pick-up and transfer conditions. When a predetermined layer of bottles has been positioned on the pallet, the transfer member is actuated to pick up a top layer pad from the layer pad store and transfer the layer pad onto or over the layer of bottles.

The layer pad transfer member includes a vacuum head assembly 35 comprising a vacuum generator, suction cups mounted to a frame. In a further embodiment (not shown) the transfer member includes a head frame guided cylinder for adjusting the height of the head assembly; and a gantry linear drive for providing substantially horizontal movement to the head assembly between the layer pad store and the pallet in a bottle receiving position.

Figure 6:
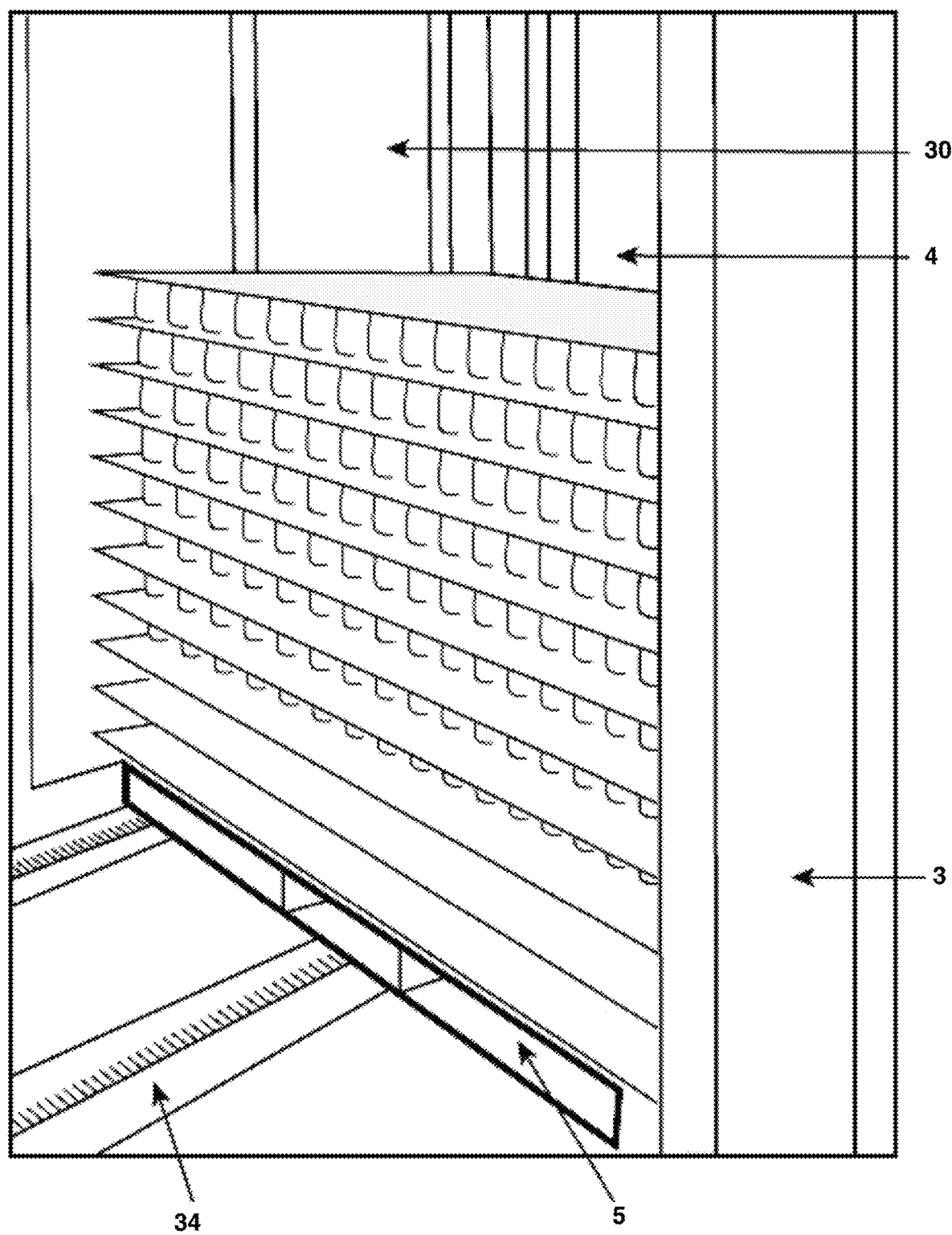
FIG. 6: is a photograph of a pallet housing of a palletiser station in accordance with an embodiment of the instant invention showing a fully loaded pallet about to exit the pallet housing.

As seen in FIG. 6, the palletiser system further includes a pallet out-feed path 34 for transferring a fully loaded pallet exiting the pallet housing of the pallet station to a further processing station downstream therefrom such as a wrapping station. The out-feed path includes a track or roller system that cooperates with the track or roller of the floor portion.

In a further embodiment (not shown), the palletiser system further includes a plastic wrapping station downstream from the out-feed path which intersects the pallet out-feed path with a rotatable platform. The wrapping station includes an upright rotatable plastic wrapping structure about which there is wound plastic wrap material.

In an operating condition, an initial portion of the wrap material is manually contacted with the loaded pallet, and the platform subsequently rotated so that the plastic wrap material is unwound from the wrapping structure and encapsulates the loaded pallet.

As best shown in FIG. 2, the palletiser system further includes a bottle manufacturing apparatus 50 upstream from the first pallet station. Bottles are manufactured by injection blow molding and dispensed by the bottle manufacturing apparatus onto the in-feed conveyor(s).

In a further embodiment in FIGS. 5 and 6, there is shown a palletiser system including multiple palletiser stations 100, 101 and 102 in a series. As shown, each pallet station includes an opening and internal passageway forming a thoroughfare through which the in-feed conveyor 8 traverses. In this embodiment the in-feed conveyor 8 is configured to have a plurality of vertically spaced and parallel bottle in-feed lines 60a, 60b and 60c, which link each of the pallet stations.

In this embodiment the series of palletiser stations are linked by the a plurality of vertically spaced apart bottle in-feed conveyor lines, wherein a first of the in-feed lines feeds bottles to the first palletiser station and subsequent in-feed lines feed bottles to the second and third palletiser stations. In this way loading of one row of bottles on a first pallet in a first pallet station can be offset with the series of palletiser stations so that loading and palletising process by the palletiser system is substantially continuous.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

A reference to any prior art in this specification is not, and should not be taken as, an acknowledgement or any form of suggestion that the referenced prior art forms part of the common general knowledge in Australia.

Throughout this specification, the words "comprise", "comprised", "comprising" and "comprises" are to be taken to specify the presence of stated features, integers, steps of components, but does not preclude the presence or addition of one or more other features, integers, steps, components or groups thereof.

In the claims, each dependent claim is to be read as being within the scope of its parent claim or claims, in the sense that a dependent claim is not to be interpreted as infringed unless its parent claims are also infringed.

INTERPRETATION

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

SCOPE OF INVENTION

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the palletizing industry and in particular to palletizing and packaging of articles.

What is claimed is:

1. A palletiser system for efficient loading and packaging of bottles, the palletiser system including:
   a first pallet station including:
      a pallet housing for receiving in-feed of a pallet(s) from a pallet in-feed path, the pallet housing having a floor portion for supporting a pallet thereon, the floor portion being movable between a pallet receiving position and a bottle receiving station in a first pathway by a first lifting means in the first pallet station, wherein in a loading condition the pallet is raised to the bottle receiving station; and
      a layer pad store aligned substantially with and in spaced apart relation to the pallet housing, the layer pad store being adapted to receive a store of layer pads for placement over a layer of bottles on a pallet;
   a passageway intermediate the pallet housing and layer pad store for communication with a bottle in-feed;
   a bottle lifting sub-assembly mounted within the passageway, wherein the bottle lifting sub-assembly includes a movable platform for receiving a predetermined row of bottles from the bottle in-feed, the movable platform adapted to move by a second lifting means between a bottle in-feed condition and a bottle transfer station located adjacent to the bottle receiving station, whereby the movable platform is raised by the lifting means to the bottle transfer station when a predetermined row of bottles is detected on the movable platform, and wherein the movable platform defines a second pathway within the first pallet station substantially parallel to the first pathway; whereby, when a predetermined number of bottles forming a row of bottles is received on a bottle receiving platform at the bottle receiving station, the movable platform is raised by the second lifting means to a predetermined level within the first pallet station located adjacent the pallet when the pallet is at the bottle receiving station;

a pusher assembly including a pusher arm member mounted within the first pallet station adjacent the bottle transfer station, the pusher arm being reciprocally operable in a third pathway above and in a transverse plane to the first and second pathway to urge a predetermined row of bottles on the bottle receiving platform at the container transfer station onto a surface portion of the pallet immediately adjacent thereto, whereby the movable platform is transferred to the bottle in-feed condition following transfer of the predetermined row of bottles for receiving a second row of bottles in a repeated cycle; and a layer pad transfer assembly located adjacent the layer pad store, the layer pad sub-assembly including a layer pad transfer means whereby when a predetermined layer of bottles is formed on the pallet, the layer pad transfer means is actuated by the layer pad assembly to engage a layer pad from the layer pad store and transfer the layer pad over and onto the layer of bottles in a fourth pathway within the first pallet station substantially parallel to the third pathway, whereby the layer pad provides a fresh surface thereon for a second and subsequent layers of bottles;

wherein when a layer pad is placed over a layer of bottles on the pallet, the floor portion of the pallet housing is incrementally lowered within the pallet housing to receive a second and progressive layers of bottle, whereby when a predetermined number of layers is stacked on the pallet, the pallet is automatically lowered within the pallet housing to the pallet receiving position to allow transfer of the pallet to an exit pathway, and receipt of a replacement pallet in a cyclical manner.

2. The palletiser system for efficient loading and packaging of bottles according to claim 1, further including a bottle in-feed conveyor for transferring multiple bottles to the first pallet station through the passageway, the in-feed conveyor having a conveying portion configured to enter the passageway in a direction substantially transverse to the pallet in-feed path.

3. The palletiser system for efficient loading and packaging of bottles according to claim 1 further including one or more palletiser stations in a series having aligned passageways for receipt of an in-feed conveyor, wherein the in-feed conveyor includes a plurality of vertically spaced and parallel bottle in-feed lines linking each pallet station such that in a single pass each bottle receiving station can receive a plurality of bottles.

4. The palletiser system for efficient loading and packaging of bottles according to claim 1 further including a pallet in-feed sub-assembly for transferring a feed of pallets from a pallet store, wherein the pallet in-feed sub-assembly includes a transfer means such as a track or roller system electrically operable to transfer a pallet along the path for loading onto the floor portion of the pallet housing, and wherein the floor portion of the pallet housing includes a track or roller system adapted to cooperate with the in-feed path to allow automatic loading of a pallet onto the floor portion.

5. The palletiser system for efficient loading and packaging of bottles according to claim 1, wherein the layer pad transfer assembly includes a subassembly mounted within the pallet station above the layer pad store for supporting sliding movement of the layer pad transfer means between a pick-up and transfer conditions, wherein the transfer means is adapted to pick up and locate a top layer pad from the layer pad store on to the layer of bottles on the pallet.

6. The palletiser system for efficient loading and packaging of bottles according to claim 1, wherein the layer pad transfer means includes:
   a vacuum head assembly comprising a vacuum generator, suction cups and a frame;
   a head frame guided cylinder for adjusting the height of the head assembly; and
   a gantry linear drive for providing substantially horizontal movement to the head assembly between the layer pad store and the pallet in a bottle receiving position.

7. The palletiser system for efficient loading and packaging of bottles according to claim 1 further including a pallet out-feed path for transferring a fully loaded pallet exiting the pallet housing of the pallet station to a further processing station downstream therefrom, and wherein the out-feed path includes a transfer means, which cooperates with the track or roller of the floor portion.

8. The palletiser system for efficient loading and packaging of bottles according to claim 1 further including a plastic wrapping station intersecting the pallet out-feed path, whereby the wrapping station includes a rotatable platform and a plastic wrapping structure, on which there is located wound plastic wrap material, wherein an initial portion of the wrap material is contacted with the loaded pallet and thereafter the platform is rotated so that the plastic wrap material is unwound from the wrapping structure about the loaded pallet.

9. The palletiser system for efficient loading and packaging of bottles according to claim 1 further including a bottle manufacturing apparatus upstream from the first pallet station, wherein bottles manufactured are dispensed by the bottle manufacturing apparatus onto the one or more bottle in-feed conveyor(s) for transfer of the bottles to one or more pallet stations for loading onto a pallet.

10. A palletiser system for efficient loading and packaging of bottles, the palletiser system including:
   a series of palletiser stations for receiving bottles and pallets for substantially continuous loading, the stations including:
   a pallet housing for receiving one or more pallets from a pallet in-feed, the pallet housing includes a movable floor portion, the floor adapted to be raised and lowered by a lifting means within the palletiser station between a pallet receiving condition and a bottle receiving location at a predetermined level, whereby the movable floor defines a first pathway within the pallet station,
   a layer pad store for receiving a stack of layer pads for placement over a layer of bottles on a pallet, the layer pad store being spaced apart from and in substantial alignment with the pallet housing;

an entrance and exit opening in each of the pallet stations defining a passageway therebetween intermediate the pallet housing and layer pad store, wherein the series of pallet stations is aligned so that the passageways form a thoroughfare;

an in-feed conveyor assembly for transferring bottles to each pallet station in a single pass including a plurality of vertically spaced and parallel bottle in-feed lines linking each line to a pallet station via the thoroughfare, wherein at least a portion of the in-feed lines extend in a pathway substantially transverse to the pallet in-feed;

a bottle lifting sub-assembly mounted within the each passageway, wherein the bottle lifting sub-assembly includes a movable platform for receiving a predetermined row of bottles from at least one of the bottle in-feed lines, the movable platform adapted to move by a second lifting means between a bottle in-feed condition and a bottle transfer station located adjacent the bottle receiving station, whereby the movable platform is raised by the lifting means to the bottle transfer station when a predetermined low of bottles is detected on the movable platform, and wherein the movable platform defines a further pathway within the first pallet station substantially parallel to the first pathway;

a bottle pusher means movably mounted to the each palletiser station adjacent the layer pad store, and operable between a stationary mode and a pushing mode, whereby in a stationary mode sufficient space is provided between the floor portion of the pallet housing and the pusher means for receiving the bottle receiving platform therebetween in a bottle dispensing position whereby the pallet and platform form a substantially continuous surface, and whereby in a pushing mode the pusher means moves over a fourth defined pathway which intersects with the second pathway for urging a row of bottles on the bottle platform onto a surface of the pallet; and a layer pad applicator sub assembly above the layer pad store including a layer pad transfer means, wherein when a predetermined layer of bottles is placed on a surface of the pallet, the layer pad transfer means is actuated to take a layer pad from the layer pad store and transfer the layer pad over and onto the layer of bottles in a fifth defined pathway overlapping the first defined pathway;

whereby when a predetermined layer of bottles is loaded onto a surface of the pallet and a layer pad is disposed on the predetermined layer, the floor portion of the pallet housing is lowered incrementally within the housing so that a fresh surface of layer pad is presented for receiving the next layer of bottles from the bottle loading platform.

* * * * *